Aug. 11, 1931.  I. V. EDGERTON  1,818,052
COMPARTMENT LOCK FOR POULTRY CARS
Original Filed Sept. 27, 1924
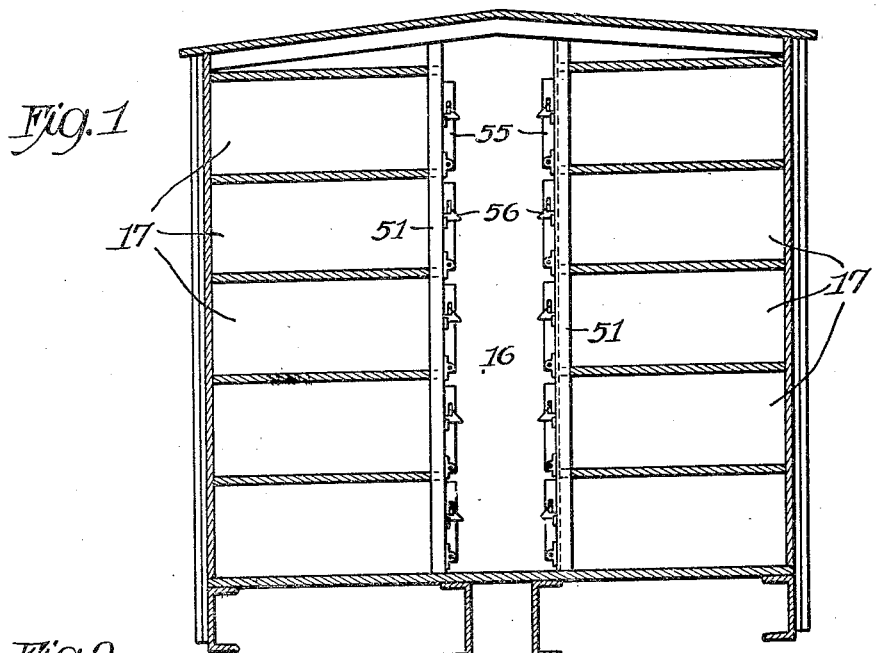
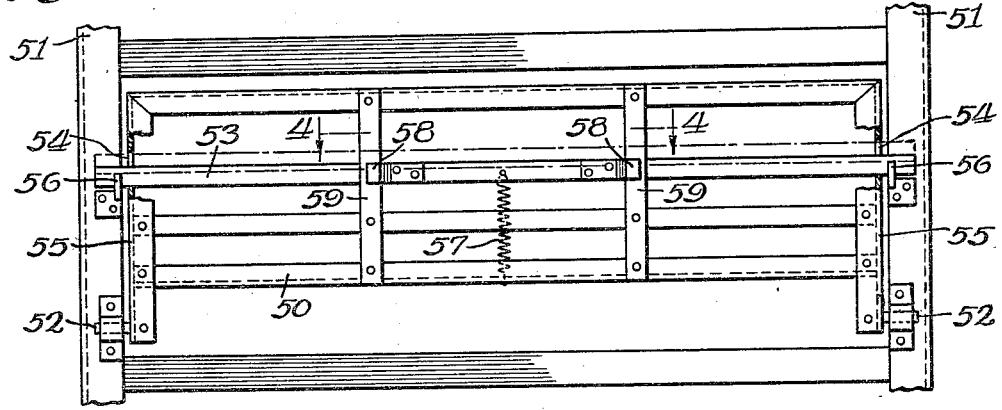
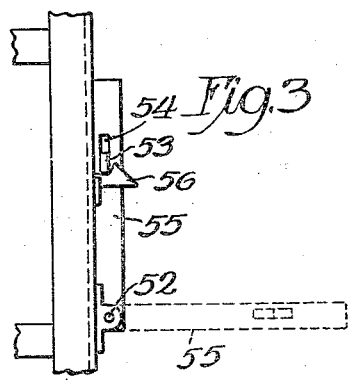
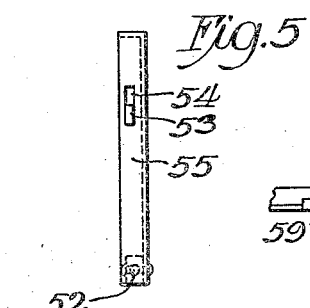
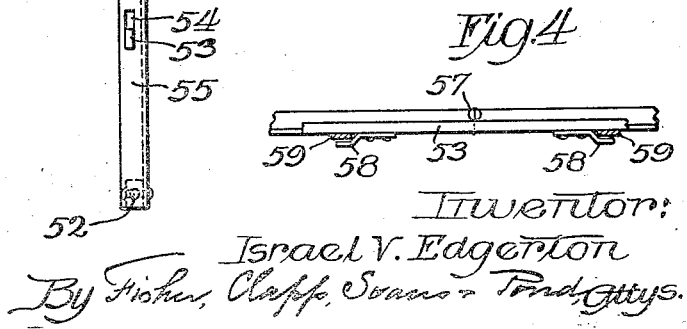
Inventor:
Israel V. Edgerton
By Fisher, Clapp, Soans & Pond, Attys.

Patented Aug. 11, 1931

1,818,052

UNITED STATES PATENT OFFICE

ISRAEL V. EDGERTON, OF CHICAGO, ILLINOIS, ASSIGNOR TO PALACE POULTRY CAR COMPANY, OF CHICAGO, ILLINOIS, A CORPORATION OF ILLINOIS

COMPARTMENT LOCK FOR POULTRY CARS

Original application filed September 27, 1924, Serial No. 740,249. Divided and this application filed January 9, 1929. Serial No. 331,249.

This invention relates to the general art of poultry cars, and has reference more particularly to an improved lock for the outwardly swinging doors of the poultry compartments. In poultry cars of the well-known modern type wherein tiers of poultry compartments are arranged on opposite sides of a longitudinal aisle, the aisle side of each compartment is customarily provided with a door or gate that can be swung outwardly into the aisle for the purpose of loading and unloading the coops. To prevent accidental escape of fowls it is essential that these doors or gates be provided with reliable and efficient locking devices; and it is further desirable that such locking devices be capable of quick release, and be preferably self-locking as the door is closed; and the provision of such an easily operable self-operating locking device is the main object of the present invention.

This application constitutes a division of an application filed by me September 27, 1924, for improvements in poultry cars, Serial No. 740,249.

The present invention is illustrated, in one simple and practical form thereof, in the accompanying drawings, in which—

Fig. 1 is a transverse section through a poultry car showing the longitudinal center aisle and tiers of poultry compartments on the opposite sides of said aisle, with doors or gates on the aisle sides of the respective compartments;

Fig. 2 is a detail front elevation, partly broken out, of one of the compartment doors or gates;

Fig. 3 is an end elevation, viewed from the left, of the parts shown in Fig. 2, the gate being shown closed in full lines, and an open position thereof being indicated by dotted lines;

Fig. 4 is a horizontal sectional view on the line 4—4 of Fig. 2;

Fig. 5 is a detail elevation of one end of the gate.

Referring to the drawings, I have shown in Fig. 1 a cross-section through the poultry compartment space of a poultry car illustrating the longitudinal center aisle of the car at 16, and on either side of this aisle compartments or coops 17 arranged in vertical tiers.

As best shown in detail views, Figs. 2 to 5 inclusive, the coops or compartments 17 for the poultry are provided on their aisle sides with individual lattice-work doors or gates 50 which are horizontally hinged as at 52 on the faces of the usual coop frame uprights 51, to enable the attendant to have convenient access to the interior of the coop. It is necessary that these gates should be provided with some form of latch to retain them in closed position, and these latches should be easily operable. I have devised a form of latch which automatically locks the gate as soon as the latter is moved to closed position. The present embodiment of my improved gate latch comprises a bar 53 which extends lengthwise of the gate with its ends projecting beyond the corresponding ends of the gate. These end portions of the bar 53 extend through guide slots 54 in plates or strips 55 secured to the ends of the gate. The usual hooks or catches 56 are provided on the coop frame to automatically engage with and retain the projecting ends of the latch bar 53 when the gate is closed. A spring 57 anchored at its lower end to the bottom frame bar of the gate and at its upper end to the latch bar 53 holds the latter in latching position, so that the latch bar automatically snaps into engagement with the locking shoulders on the catches as soon as the gate is closed. The gate is unlocked by merely grasping the bar and lifting it clear of the catches. Thus the gate may be unlocked at both ends simultaneously by grasping the latch bar at or near its central portion by one hand. Guide plates such as shown at 58 attached to the locking bar 53 may be provided to slidingly engage the outer sides of the intermediate cross-bars 59 of the gate and thus facilitate the uniform up and down movement of the locking bar. While the spring 57 aids gravity in insuring the automatic engagement of the locking bar with its catches, yet I have found in practice that this spring is not indispensable, and may be omitted, where the locking bar has free up and down sliding movement on its guides.

I claim:—

1. An automatic latch mechanism for a vertically swinging gate, comprising a horizontal latch bar bodily slidable vertically on the gate and having its end portions projecting beyond the corresponding ends of the gate, and a pair of fixed catch members formed with beveled free ends over which the ends of the latch bar ride as the gate is closed and with shoulders behind said beveled ends automatically engaging with and retaining said ends of the latch bar when the gate is closed.

2. An automatic latch mechanism for a vertically swinging gate, comprising a horizontal latch bar bodily slidable vertically on the gate and having its end portions projecting beyond the corresponding ends of the gate, a pair of fixed catch members formed with beveled free ends over which the ends of the latch bar ride as the gate is closed and with shoulders behind said beveled ends automatically engaging with and retaining said ends of the latch bar when the gate is closed, and spring means anchored at one end to the gate and at the other end to said latch bar and operating, when the gate is closed, to urge said latch bar into locking engagement with the shoulders of said catch members.

ISRAEL V. EDGERTON.